United States Patent
Abele et al.

(10) Patent No.: US 11,338,849 B2
(45) Date of Patent: May 24, 2022

(54) METHOD FOR ANALYZING AND/OR AT LEAST PARTIALLY COMPENSATING STEERING WHEEL TORSIONAL VIBRATIONS

(71) Applicant: Robert Bosch GmbH, Stuttgart (DE)

(72) Inventors: Stefan Abele, Waldstetten (DE); Thomas Seibold, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 16/617,287

(22) PCT Filed: Apr. 3, 2018

(86) PCT No.: PCT/EP2018/058436
§ 371 (c)(1),
(2) Date: Nov. 26, 2019

(87) PCT Pub. No.: WO2019/001787
PCT Pub. Date: Jan. 3, 2019

(65) Prior Publication Data
US 2020/0086915 A1    Mar. 19, 2020

(30) Foreign Application Priority Data

Jun. 29, 2017 (DE) .................... 10 2017 211 043.0

(51) Int. Cl.
*B62D 6/06* (2006.01)
*B62D 15/02* (2006.01)
*B62D 5/04* (2006.01)

(52) U.S. Cl.
CPC ............. *B62D 6/06* (2013.01); *B62D 15/029* (2013.01)

(58) Field of Classification Search
CPC ........ B62D 6/06; B62D 15/02; B62D 15/029; B62D 5/04; B62D 5/0457; B62D 5/046;
(Continued)

(56) References Cited

U.S. PATENT DOCUMENTS

2006/0284839 A1* 12/2006 Breed .................... B62D 1/046
345/156
2008/0243329 A1* 10/2008 Hamel ................. B62D 5/0472
701/31.4
(Continued)

FOREIGN PATENT DOCUMENTS

DE    10 2008 036 001 A1    2/2010
DE    10 2009 028 448 A1    5/2011
(Continued)

OTHER PUBLICATIONS

International Search Report corresponding to PCT Application No. PCT/EP2018/058436, dated Jun. 22, 2018 (German and English language document) (7 pages).

*Primary Examiner* — Khoi H Tran
*Assistant Examiner* — Sarah A Tran
(74) *Attorney, Agent, or Firm* — Maginot, Moore & Beck LLP

(57) ABSTRACT

The disclosure relates to a method for analyzing and/or at least partially compensating steering wheel torsional vibrations, particularly during operation of a steering device in a vehicle, wherein at least one sensing signal is acquired and at least one interference characteristic variable which is correlated to the steering wheel torsional vibration is extracted from the sensing signal. It is proposed that during a monitoring time interval a change over time in the interference characteristic variable and a change over time in a wheel frequency which is correlated to a current wheel rotational speed characteristic variable is monitored and said changes are combined in order to analyze and/or to at least partially compensate steering wheel torsional vibrations to form a common evaluation dataset.

16 Claims, 6 Drawing Sheets

(58) Field of Classification Search
CPC ........ B62D 5/0472; B62D 7/22; B62D 7/222;
B62D 7/224; B62D 7/226; B62D 7/228
See application file for complete search history.

(56) References Cited

U.S. PATENT DOCUMENTS

2009/0294206 A1* 12/2009 Oblizajek ............ B62D 5/0472
180/446
2011/0109475 A1* 5/2011 Basnayake ....... G08G 1/096783
340/902

FOREIGN PATENT DOCUMENTS

| | | | |
|---|---|---|---|
| DE | 10 2010 031 211 A1 | 1/2012 | |
| DE | 10 2012 104 253 A1 | 7/2013 | |
| DE | 10 2014 204 097 A1 | 9/2014 | |
| DE | 102014204097 A1 * | 9/2014 | ........... B62D 5/0472 |
| EP | 1 975 040 A1 | 10/2008 | |
| JP | 2004-161073 A | 6/2004 | |
| JP | 2004161073 A * | 6/2004 | |
| JP | 2008-254728 A | 10/2008 | |
| JP | 2013-534490 A | 9/2013 | |
| JP | 2015-178286 A | 10/2015 | |
| JP | 2017-13699 A | 1/2017 | |

\* cited by examiner

METHOD FOR ANALYZING AND/OR AT LEAST PARTIALLY COMPENSATING STEERING WHEEL TORSIONAL VIBRATIONS

This application is a 35 U.S.C. § 371 National Stage Application of PCT/EP2018/058436, filed on Apr. 3, 2018, which claims the benefit of priority to Serial No. DE 10 2017 211 043.0, filed on Jun. 29, 2017 in Germany, the disclosures of which are incorporated herein by reference in their entirety.

BACKGROUND

The disclosure relates to on a method for analyzing and/or at least partially compensating for steering wheel torsional vibrations.

Moreover, the disclosure relates to a steering device, a system, and a control unit.

Methods for analyzing and/or compensating for steering wheel torsional vibrations are known from the prior art.

In this context, for example, using a transfer function for compensating for steering wheel torsional vibrations is known, which computes an active counter torque on the basis of a torque signal and supplies this counter torque to an electric motor of a steering system. The transfer function is generally iteratively determined in this case on the basis of individual vehicles of a specific vehicle variant and stored in a control unit during a production of a vehicle. The behavior of the transfer function varies strongly over the vehicles of the vehicle variant because of manufacturing-related tolerances and/or appearances of aging, so that it is unclear how well the transfer function works in the vehicle or other vehicles of the same vehicle variant. This has the result that an optimization of the transfer function is only possible after time-consuming tuning by the customer. However, the function can be optimized better and faster on the basis of measurement data coming directly from the vehicles.

Furthermore, for example, DE 10 2009 028 448 A1 discloses a method for detecting steering wheel torsional vibrations, wherein a rotor position or a rotor velocity is detected and a dominant interference frequency is ascertained from the detected rotor position or the detected rotor velocity. The interfering frequency can then be used together with a present vibration form to detect and compensate for steering wheel torsional vibrations. However, analysis and/or monitoring of the interference frequency and/or the vibration form does not take place in this case, so that an effectiveness of the compensation is solely representative for the corresponding vehicle and is only subjectively perceptible by the driver, but cannot be transferred to other vehicles.

The object of the disclosure is in particular to provide an advantageously flexible method with improved properties with respect to a behavior analysis and/or a compensation effect.

SUMMARY

The disclosure is based on a method for analyzing and/or at least partially compensating for steering wheel torsional vibrations, in particular during operation of a steering device in a vehicle, wherein at least one detection signal is detected, in particular by means of a detection unit, and at least one interference parameter correlated with the steering wheel torsional vibration is extracted from the detection signal.

It is proposed that a chronological change of the interference parameter and a chronological change of a wheel frequency correlated with a present wheel speed parameter be monitored during a monitoring time interval, in particular the entirety thereof, and be combined to form a common evaluation data set for analyzing and/or at least partially compensating for the steering wheel torsional vibrations. The wheel frequency is advantageously ascertained in this case from the present wheel speed parameter, wherein the present wheel speed parameter can in particular be detected by means of a sensor unit and/or retrieved from a vehicle control unit or vehicle bus system. A particularly flexible method can be provided by this embodiment in particular, which permits an advantageous behavior analysis and/or improves an effectiveness of a compensation of the steering wheel torsional vibrations. Furthermore, an effectiveness of a compensation is advantageously verifiable in this case in all vehicles of a vehicle variant, whereby in particular outliers can be recognized and/or extensive phenomena can be analyzed and in this way iteration loops and/or complaints can be reduced. Furthermore, batch effects can be recognized and/or trends can be associated with successively produced steering systems and/or vehicles. In addition, an efficiency, in particular a production efficiency, a maintenance efficiency, a compensation efficiency, and/or a cost efficiency, can advantageously be improved therefrom.

A "steering device" is to be understood in this context in particular as at least one part, in particular a subassembly, of a steering system, in particular of a vehicle and preferably of a motor vehicle. In particular, the steering device can also comprise the entire steering system. Moreover, the steering device in particular comprises a detection unit, which is provided to detect at least one detection signal, in particular at least the above-mentioned detection signal, and/or a processing unit, which is provided to execute the method for analyzing and/or at least partially compensating for the steering wheel torsional vibrations. In addition, the steering device can comprise further components and/or assemblies, for example, at least one steering wheel, at least one steering column, in particular having at least one steering spindle, at least one steering gear, an assistance unit, in particular operationally connected to the steering gear, for generating and/or providing a steering assistance, and/or the sensor unit for ascertaining the wheel speed parameter. "Provided" is to be understood in particular as specially programmed, designed, and/or equipped. An object being provided for a specific function is to be understood in particular to mean that the object fulfills and/or executes this specific function in at least one application and/or operating state.

A "detection unit" is to be understood in particular as a unit, which is operationally connected to the processing unit in particular, and which is provided for a contacting and/or advantageously contactless detection of the detection signal. In particular, the detection unit comprises for this purpose at least one, preferably electrical, acoustic, optical, and/or magnetic detection element, which can advantageously be designed as a passive and/or active sensor. In addition, the detection unit is provided in particular to provide the detection signal and/or a signal correlated with the detection signal and in particular to relay it in a wireless and/or advantageously wired manner to the processing unit. The detection signal could in this case be, for example, a signal correlated with the assistance unit and/or correlated with a motor of the assistance unit, for example, a rotor position angle, a rotor velocity, and/or preferably a motor torque, in particular an actual motor torque. The detection signal could preferably also, for example, be correlated with the wheel speed parameter and/or correspond to the wheel speed parameter. However, the detection signal is particularly preferably a signal correlated with the steering column, in particular a pinion angle of a steering pinion of the steering gear, a steering wheel angle of the steering wheel, and/or particularly advantageously a steering-spindle-side torque signal.

Moreover, a "processing unit" is to be understood in particular as an electronic unit which comprises an information input, an information processing unit, and an information output. The processing unit furthermore advantageously comprises at least one processor, at least one memory, at least one input and/or output means, at least one operating program, at least one regulating routine, at least one control routine, at least one compensation routine, at least one computation routine, and/or at least one evaluation routine. In particular, the processing unit is provided at least to extract at least one interference parameter correlated with a steering wheel torsional vibration, in particular by means of the evaluation routine, from a detection signal, to monitor a chronological change of the interference parameter and a chronological change of a of a wheel frequency correlated with a present wheel speed parameter during a monitoring time interval, in particular the entirety thereof, and to combine them to form a common evaluation data set for analyzing and/or at least partially compensating for the steering wheel torsional vibrations. In addition, the processing unit is preferably provided to at least partially compensate for the steering wheel vibrations, in particular by means of the compensation routine and a transfer function preferably stored within the memory of the processing unit. For this purpose, a compensation signal, in particular a compensation motor torque, is generated in at least one operating state in dependence on the detection signal and using the transfer function, which compensation signal is supplied to the assistance unit and in particular the motor of the assistance unit to at least partially compensate for the steering wheel torsional vibrations. The steering device and preferably the processing unit particularly advantageously furthermore comprises an activation unit, which is provided to activate and/or deactivate a compensation of the steering wheel torsional vibrations, in particular by means of the compensation routine and the transfer function, in dependence on operating parameters of the vehicle and; or the steering device, for example, a present vehicle velocity, a present steering angle, and/or a present utilization of a vehicle electrical system. The processing unit is preferably moreover integrated into a control unit of the steering device.

In addition, an "interference parameter" is to be understood in particular as a parameter which is correlated with a steering wheel torsional vibration, which is based on a vehicle malfunction and is caused, for example, by an imbalance in a brake disk ("brake judder") and/or an imbalance in a vehicle wheel ("shimmy"). In particular, a presence, a strength, a type, and/or a cause of the steering wheel torsional vibration can be concluded and/or a presence, a strength, a type, and/or a cause of the steering wheel torsional vibration can be ascertained at least on the basis of the interference parameter. The interference parameter can be in particular an interference frequency and/or an interference phase in this case. The interference parameter is particularly preferably, however, an. interference amplitude, whereby in Particular an advantageously simple evaluation can be achieved. The interference parameter formed as an interference amplitude is advantageously observed and/or evaluated at least: in an interval between 0 Nm and 0.7 Nm, preferably between 0 Nm and 0.5 Nm, and particularly preferably between 0 Nm and 0.3 NM. The interference parameter formed as an interference amplitude is particularly advantageously detected in this case in at most 0.1 Nm steps, advantageously in 0.05 Nm steps, and particularly advantageously in 0.02 Nm steps. Furthermore, a "wheel speed parameter" is to be understood in particular as a parameter which is correlated with a wheel speed of the vehicle wheel. In particular, a present wheel speed can be concluded and/or a present wheel speed can be determined at least on the basis of the wheel speed parameter. The wheel speed parameter preferably corresponds to a wheel speed of a single vehicle wheel of the vehicle or a variable ascertained, preferably computed, from at least two vehicle wheels of the vehicle, preferably a mean value of the wheel speeds of the vehicle wheels. The wheel frequency which in particular can be ascertained from the wheel speed parameter is preferably observed and/or evaluated at least in an interval between 5 Hz and 35 Hz and preferably between 9 Hz and 18 Hz. The wheel frequency is particularly advantageously detected in this case in at most 1 Hz steps and advantageously in 0.5 Hz steps. A "monitoring time interval" is to be understood in particular as a time interval, which is in particular longer-lasting and is advantageously correlated with a service life of the steering device, the steering system, and/or the vehicle, and in which changes of the interference parameter and the wheel frequency are detected. In particular, the monitoring time interval can comprise in this case a period of time of multiple days, preferably of multiple weeks, preferably of multiple months, and particularly preferably of multiple years. In addition, the phrase that "a chronological change of the interference parameter and/or the wheel frequency is monitored" is to be understood in particular to mean that values of the interference parameter and/or the wheel frequency are detected and preferably collected, in particular continuously and/or at regular time intervals, and/or a frequency and/or duration is detected in which the interference parameter and/or the wheel frequency are in a defined state, particularly preferably a predefined state.

Furthermore, it is proposed that the detection signal is preferably filtered on the basis of the wheel frequency to extract the interference parameter, whereby the interference parameter can in particular be advantageously simply ascertained and/or linked to the wheel frequency. The filtering preferably takes place in this case by means of a bandpass filter, which is advantageously frequency-variable, and the resonant frequency of which is preferably set using the wheel frequency, the wheel speed parameter, a present wheel velocity, and/or a present vehicle velocity.

The evaluation data set could be evaluated for analyzing the steering wheel torsional vibrations and/or used for at least partially compensating for the steering wheel torsional vibrations, for example, in the form of a table, a point diagram, a bar diagram, and/or a ring diagram or the like. However, it is preferably proposed that the evaluation data set be used to produce a heat map and the heat map be evaluated at least to analyze the steering wheel torsional vibrations. In this way, in particular an advantageously rapid analysis and/or evaluation of the evaluation data set can be performed. Moreover, an advantageously simple further processing of the evaluation data set can be achieved. Alternatively or additionally, the heat map can furthermore also be used for at least partially compensating for the steering wheel torsional vibrations. Moreover, multiple evaluation data sets, in particular from multiple further vehicles, could be used to produce a common heat map, on the basis of which advantageously vehicle-specific and/or vehicle-type-specific steering wheel torsional vibrations and/or trends can be recognized.

In a further embodiment of the disclosure, it is proposed that a chronological rate of change of the interference parameter and/or the wheel frequency be ascertained in the evaluation data set and at least be taken into consideration for analyzing the steering wheel torsional vibrations. In this way, in particular unusual variations can be detected and/or long-term behavior can be analyzed. The chronological rate of change advantageously corresponds in this case to an advantageously longer, for example, lasting over at least one week and/or at least one month, change of the interference parameter and/or the wheel frequency. The change of the interference parameter and/or the wheel frequency is preferably different from a short-term and/or temporary change of the interference parameter and/or the wheel frequency, for example, over a few minutes, hours, and/or days, in particular to exclude temporary malfunctions. Alternatively or additionally, the chronological rate of change of the interference parameter and/or the wheel frequency can also be used for at least partially compensating for the steering wheel vibrations.

In addition, it is proposed that at least one state parameter and advantageously multiple, in particular at least two and advantageously at least three, state parameters of an activation unit, in particular the above-mentioned activation unit, for activating and/or deactivating a compensation of the steering wheel torsional vibrations in dependence on operating parameters of the vehicle, in particular of the steering device, be ascertained and taken into consideration at least for analyzing the steering wheel torsional vibrations. An effectiveness of a compensation behavior can advantageously be analyzed in this way. A "state parameter" is to be understood in this case in particular as a parameter which is correlated with a state of the activation unit, for example, "compensation active", "compensation inactive", and/or "waiting", and advantageously defines a status of a compensation of the steering wheel torsional vibrations. In particular, in this case the state of the activation unit can be concluded and/or the state of the activation unit can be determined at least on the basis of the state parameter. Particularly preferably, a frequency and/or a dwell time of the activation unit in one of the states can particularly preferably be concluded and/or a frequency and/or a dwell time of the activation unit in one of the states can be determined on the basis of the state parameter. Alternatively or additionally, the state parameter can also be used for at least partially compensating for the steering wheel torsional vibrations.

The evaluation data set could be evaluated, for example, within the processing unit, in particular by means of the evaluation routine. In one preferred embodiment of the disclosure, however, it is proposed that the evaluation data set be read out via a communication interface, in particular a diagnostic interface, for example, an OBD2 port, and/or a vehicle-internal bus communication interface and/or be transmitted wirelessly, preferably by means of a central communication unit ("CCU"), for example, via a mobile wireless connection, a WLAN connection, or the like, to an external and advantageously central analysis unit at least for analyzing the steering wheel torsional vibrations. In this way, in particular an advantageously high processing power can be provided and an advantageously rapid evaluation can be achieved. Moreover, the evaluation data set can in particular be evaluated promptly and in particular fully automatically.

Furthermore, it is proposed that at least one notification message be generated if a behavior deviating from a normal state is detected during an analysis of the evaluation data set, for example, if defined threshold values are exceeded. The notification message can be displayed in this case in particular by means of a display unit of the vehicle and/or the steering device, for example, a warning lamp, and/or transmitted to an external electronic unit, for example, the analysis unit, a diagnostic unit, a laptop, and/or a smart phone or the like. In particular, an advantageous notification function and/or warning function can be implemented in this way. In particular, in this way items of information, in particular about deficiencies in a chassis of the vehicle and/or in the steering system, for example, balancing weight lost, tie rod play, or loose wheel, can be detected and transmitted to a driver and/or a repair shop.

In a further embodiment of the disclosure, it is proposed that a transfer function for generating a compensation signal, in particular the above-mentioned transfer function, be adapted at least using the evaluation data set and/or a combination of multiple evaluation data sets from different further vehicles, in particular one time, for example, by a software update, and/or continuously, for example, by means of a regulator loop, for at least partially compensating for the steering wheel torsional vibrations. In this way, an adaptation of a compensation behavior can advantageously be achieved in operation of the vehicle, whereby in particular recalls and/or complaints can be reduced.

It is furthermore preferably proposed that a learning algorithm, advantageously a machine learning algorithm, for example, an artificial neuronal network, which is provided at least on the basis of the evaluation data set for an optimization of the at least partial compensation of the steering wheel torsional vibrations, be used to adapt the transfer function. In this case, by means of the learning algorithm, a typical and in particular fault-free behavior of the steering device, in which steering wheel torsional vibrations are minimized, is advantageously learned by means of the learning algorithm. The learning algorithm preferably corresponds to a data-driven learning algorithm, wherein advantageously a plurality of ascertained and/or ascertainable data and/or parameters of the steering device, the steering system, and/or the vehicle are used and/or linked to one another. The learning algorithm can in particular be stored in this case in the memory of the processing unit or can be part of a central external computer system. In this way, in particular an advantageously simple and/or independent optimization can be achieved, wherein in particular an explicit specification and/or adaptation of the transfer function can be omitted.

An advantageous documentation of ubiquitous phenomena and/or a particularly high level of effectiveness of the compensation behavior can in particular be achieved if at least one further evaluation data set and preferably a plurality of further evaluation data sets, in particular from a further vehicle and preferably a plurality of further vehicles, preferably of the same vehicle variant, are ascertained and combined with the evaluation data set for analyzing and/or at least partially compensating for the steering wheel torsional vibrations. In particular, the evaluation data sets could also be used in this case to prepare a common heat map. Moreover, in this way in particular data can be collected and evaluated for a vehicle variant and also for each individual vehicle.

The method for analyzing and/or at least partially compensating for steering wheel torsional vibrations is not to be restricted in this case to the above-described application and specific embodiment. In particular, the method for analyzing and/or at least partially compensating for steering wheel torsional vibrations can comprise a number of individual elements, components, and units deviating from a number mentioned herein to fulfill a functionality described herein.

BRIEF DESCRIPTION OF THE DRAWINGS

Further advantages are apparent from the following description of the drawings. An exemplary embodiment of the disclosure is illustrated in the drawings. The drawings and the description contain numerous features in combination. A person skilled in the art will expediently also consider the features individually and combine them to form reasonable further combinations.

In the figures.

DETAILED DESCRIPTION

Figure 1A:
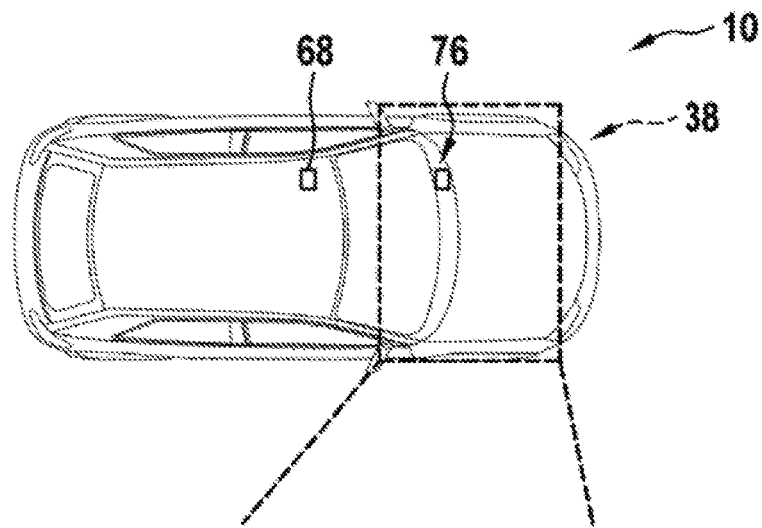
FIGS. 1a-b show an exemplary vehicle having a steering system comprising a steering device in a simplified illustration.
Figure 1B:
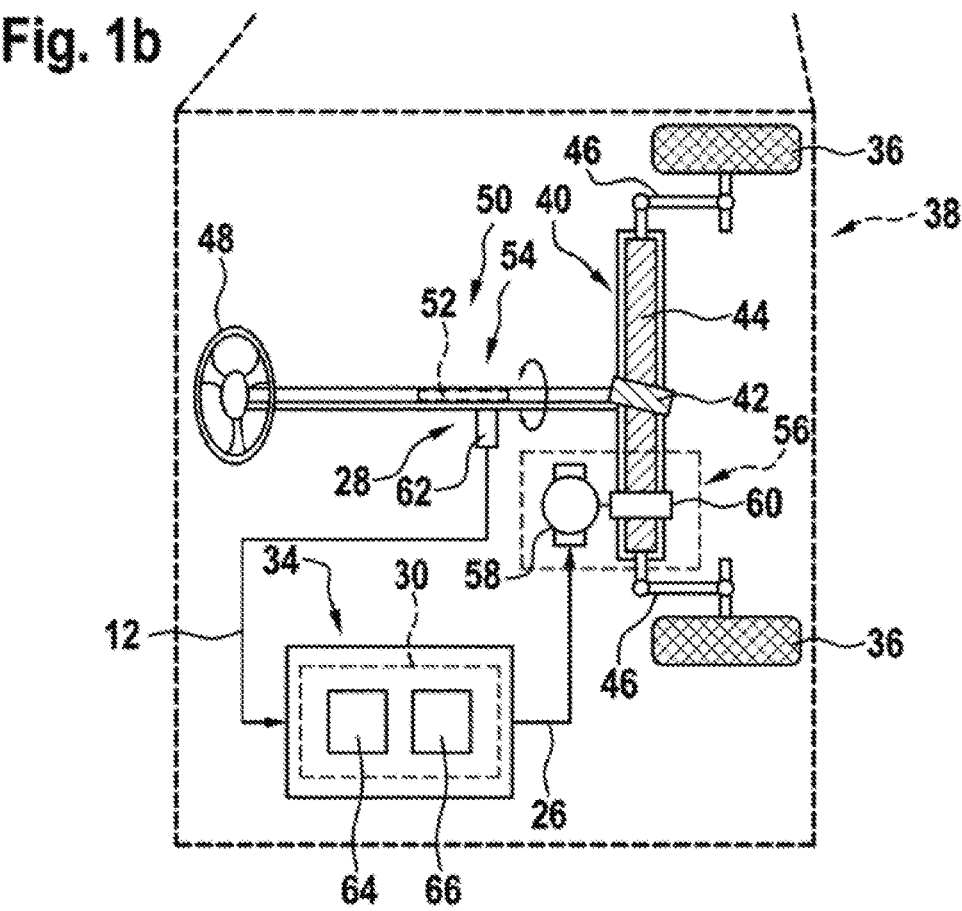

FIGS. 1a and 1b show a vehicle 10 formed by way of example as a motor vehicle having multiple vehicle wheels 36 and having a steering system 38 in a simplified illustration. The steering system 38 has an operational connection to the vehicle wheels 36 and is provided for influencing a travel direction of the vehicle 10.

The steering system 38 comprises a steering device. The steering device comprises a steering gear 40. The steering gear 40 is designed as a rack-and-pinion steering gear. The steering gear 40 comprises a steering pinion 42 and a toothed rack 44 mechanically coupled to the steering pinion 42. The steering gear 40 has an operational connection to at least two of the vehicle wheels 36, in particular two front wheels of the vehicle 10. The steering gear 40 is provided to effectuate a pivot movement and/or rotational movement of the vehicle wheels 36. The steering gear 40 is provided to convert a steering specification into a steering movement of the vehicle wheels 36. In principle, however, a steering gear could also be designed as a worm steering gear, as a threaded spindle steering gear, and/or as a recirculating ball steering gear.

The steering device furthermore comprises at least one steering linkage 46. In the present case, the steering device comprises a steering linkage 46 on each vehicle side, which mechanically connects the steering gear 40, in particular the toothed rack 44, to one of the vehicle wheels 36. In principle, however, it is also conceivable to dispense with a steering linkage and/or to integrate a steering linkage into a steering gear.

In addition, the steering device comprises a steering wheel 48. The steering wheel 48 is arranged on a side of the steering system 38 facing toward a driver. The steering wheel 48 is used to apply a manual steering torque. The steering wheel 48 is provided for manually controlling the travel direction of the vehicle 10. The steering wheel 48 is provided to introduce the manual steering torque into the steering gear 40 and in this way to transmit it to the vehicle wheels 36.

The steering device furthermore comprises a steering column 50 for connecting the steering wheel 48 to the steering gear 40. In the present case, the steering column 50 connects the steering wheel 48 permanently to the steering gear 40, in particular mechanically. The steering column 50 is provided at least to transmit the manual steering torque applied in particular by the driver to the steering gear 40. Furthermore, the steering column 50 comprises at least one torsion element 52, in the present case in particular a torsion bar, and a steering spindle 54 for accommodating the torsion element 52. Alternatively, a steering column could also only connect a steering wheel to a steers ng gear sometimes, for example, in a vehicle having an autonomous driving mode. Moreover, it is also conceivable in principle to dispense with a steering spindle and/or a torsion element. Moreover, a steering device could additionally comprise at least one intermediate shaft.

Furthermore, the steering device in the present case comprises an assistance unit 56 for generating and/or providing a steering assistance. The assistance unit 56 is designed as electrical. The assistance unit 56 has an operational connection to the steering gear 40. The assistance unit 56 comprises a motor 58, formed in the present case in particular as an electric motor, and a drive pinion 60 mechanically coupled to the toothed rack 44. The assistance unit 56 is provided to introduce an assistance torque into the steering gear 40, in particular via the drive pinion 60. The assistance unit is provided to assist the manual steering torque, which is applied in particular by the driver. Alternatively, however, an assistance unit could also be designed as at least partially hydraulic. In addition, an assistance unit could also comprise, in particular instead of a drive pinion, for example, a belt, preferably having a ballscrew drive. Moreover, an assistance unit could also be provided to introduce an assistance torque into a steering column.

Furthermore, the steering device comprises a detection unit 28. The detection unit 28 is arranged in a region of the torsion element 52 and/or the steering spindle 54. The detection unit 28 has an operational connection to the torsion element 52 and/or the steering spindle 54. The detection unit 28 is provided for a detection, which is contactless in particular, of a detection signal 12, in the present case in particular a steering-spindle-side torque signal. For this purpose, the detection unit 28 comprises by way of example precisely one detection element 62, designed in particular as a torque sensor. Alternatively, however, a detection unit could also comprise multiple detection elements and/or could be provided to detect a rotor position angle, a rotor velocity, a motor actual torque, and/or a wheel speed parameter.

In addition, the steering device has a control unit 34. The control unit 34 comprises a processing unit 30. The processing unit 30 is designed as electronic. The processing unit 30 comprises at least one processor 64, for example, in the form of a microprocessor, and at least one memory 66. Moreover, the processing unit 30 comprises at least one operating program stored in the memory 66 having at least one computation routine, at least one control routine, at least one evaluation routine, and at least one compensation routine.

The control unit 34, in particular the processing unit 30, has an operational connection to the detection unit 28. In the present case, the control unit 34 is electrically connected to the detection unit 28, for example, by means of a data connection and/or a bus system. The processing unit 30 is provided in this case at least for receiving the detection signal 12 and/or a signal correlated with the detection signal 12 from the detection unit 28.

The control unit 34, in particular the processing unit 30, furthermore has an operational connection to the assistance unit 56. In the present case, the control unit is electrically connected to the assistance unit 56, for example, by means of a data connection and/or a bus system. The processing unit 30 is provided in this case at least for activating the motor 58 and thus in particular for setting the assistance torque, in particular in dependence on the detection signal 12.

Furthermore, the vehicle 10 comprises a communication unit 68. The communication unit 68 is formed as a central communication unit ("CCU"). The communication unit 68 is provided for wireless communication, for example, a mobile wireless connection and/or a WLAN connection or the like. Alternatively or additionally, a vehicle could also have a communication interface, in particular a vehicle diagnostic interface, for example, an OBD2 port. In addition, a steering system and/or a steering device could in principle also comprise an additional further communication unit which is separate in particular from the communication unit of the vehicle.

Steering wheel torsional vibrations can occur during driving operation of the vehicle 10, in particular in a critical velocity range between 80 km/h and 140 km/h. The steering wheel torsional vibrations are caused, for example, by an imbalance in a brake disk ("brake judder") and/or an imbalance in a vehicle wheel ("shimmy"). Such steering wheel torsional vibrations are generally perceived as annoying by the driver and are therefore advantageously at least partially compensated for by means of various measures.

Figure 2:
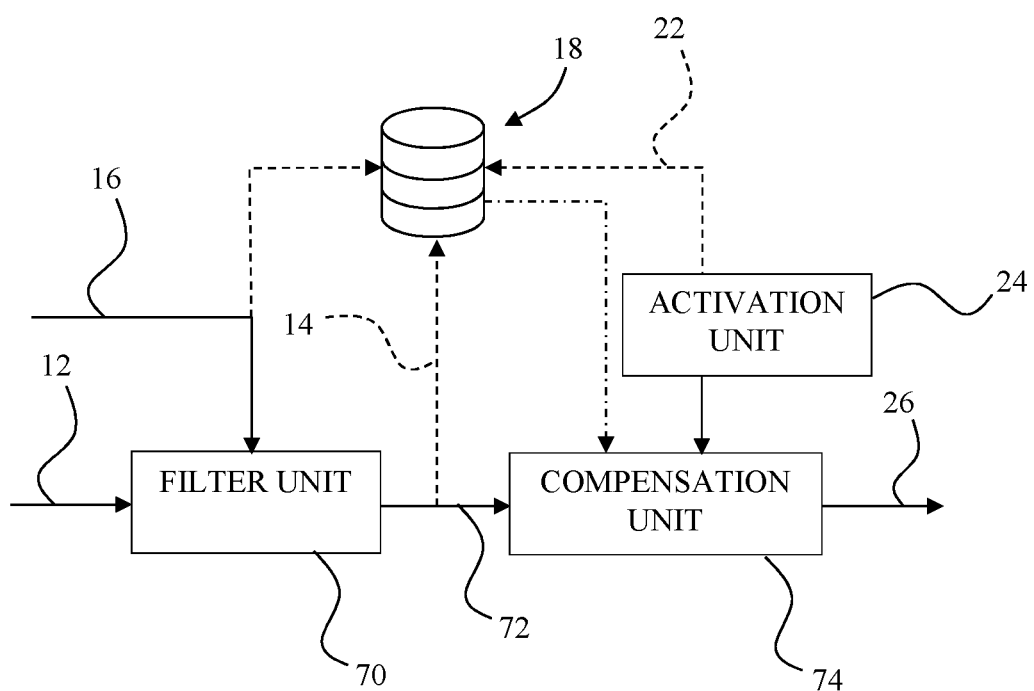
FIG. 2 shows a schematic illustration of a signal flow diagram for analyzing and/or at least partially compensating for steering wheel torsional vibrations.

A signal flow diagram for at least partially compensating for steering wheel torsional vibrations during an operation of the steering device is illustrated in FIG. 2.

In the present case, the processing unit 30 is provided here at least to execute a method for at least partially compensating for steering wheel torsional vibrations, in particular by means of the compensation routine and a transfer function stored within the memory 66, and comprises for this purpose in particular a computer program having corresponding program code means.

In this case, the detection signal 12 is detected by means of the detection unit 28 and supplied for filtering to a filter unit 70 of the steering device. Moreover, a present wheel frequency 16 is ascertained from a present wheel speed parameter and also supplied to the filter unit 70. The present wheel speed parameter advantageously corresponds to a mean value of the wheel speeds of the vehicle wheels 36 and can be detected by means of a sensor unit and/or retrieved from a vehicle control unit or vehicle bus system, for example. The filter unit 70 is formed in the present case as a frequency-variable bandpass filter, the resonant frequency of which is set using the wheel frequency 16. The filter unit 70 can be integrated in this case, for example, into the detection unit 28 or the control unit 34. Alternatively, the filter unit 70 can also be formed separately from the detection unit 28 and the control unit 34, however. The filter unit filters the detection signal 12 on the basis of the wheel frequency 16 and generates a filtered detection signal 72. In principle, however, it is also conceivable to dispense with filtering of a detection signal.

The filtered detection signal 72 is subsequently supplied to a compensation unit 74 of the processing unit 30, in which the compensation routine is stored. The compensation unit 74 generates a compensation signal 26, in particular a compensation motor torque, using the transfer function, which is supplied to the assistance unit 56 for at least partially compensating for the steering wheel torsional vibrations.

Moreover, the processing unit 30 comprises an activation unit 24, which is operationally connected to the compensation unit 74 and in particular can take controlling action on the compensation unit 74. The activation unit 24 is provided to activate and/or deactivate a compensation of the steering wheel torsional vibrations by means of the compensation unit 74 in dependence on operating parameters of the vehicle 10, for example, a present vehicle velocity, a present steering angle, and/or a present utilization of a vehicle electrical system. For this purpose, the activation unit comprises multiple state parameters 22, for example, "compensation active", "compensation inactive", and/or "waiting", which define a status of the activation unit 24 and/or the compensation unit 74.

In addition, the processing unit 30 is provided for the purpose, in particular by means of the evaluation routine, of executing a method for analyzing and/or at least partially compensating for steering wheel torsional vibrations and comprises for this purpose in particular a further computer program having corresponding further program code means.

In this case, the detection signal 12 is detected by means of the detection unit 28 and an interference parameter 14 correlated with the steering wheel torsional vibration, in the present case in particular an interference amplitude, is extracted from the detection signal 12. To extract the interference parameter 14, the detection signal 12 is furthermore filtered on the basis of the wheel frequency 16 by means of the filter unit 70. In the present case, the interference parameter 14 is thus identical to the filtered detection signal 72. In principle, the interference parameter 14 could also deviate from the filtered detection signal 72, however. Moreover, filtering of a detection signal could also be omitted for the extraction of an interference parameter.

Subsequently, during an entire monitoring time interval, which is correlated in particular with a service life of the steering device, the steering system 38, and/or the vehicle 10, at least one chronological change of the interference parameter 14 and a chronological change of the wheel frequency 16 are monitored and combined to form a common evaluation data set 18.

To analyze the steering wheel torsional vibrations, the evaluation data set 18 is subsequently used to prepare a heat map (cf. in particular FIG. 3). Additionally or alternatively, a chronological rate of change of the interference parameter 14 and/or the wheel frequency 16 can be ascertained in the evaluation data set 18 and also taken into consideration for the analysis of the steering wheel torsional vibrations (cf. in particular FIG. 4). In addition, the state parameters 22 of the activation unit 24 can be read out and also collected in the evaluation data set 18 for the analysis of the steering wheel torsional vibrations (cf. in particular FIG. 5). Moreover, further evaluation data sets 20 from further vehicles 11 can also be ascertained and combined with the evaluation data set 18 (cf. in particular FIG. 7). The evaluation data set 18 can subsequently, for example, after a longer-lasting period of time, for example, multiple months, be transmitted wirelessly via the communication unit 68, for example, via a mobile wireless connection and/or a WLAN connection or the like, to an external analysis unit (not shown), whereby an advantageous central evaluation of the evaluation data set 18 can be achieved. Alternatively, the evaluation data set could also be evaluated within a processing unit, however. Moreover, an arbitrary diagram type deviating from a heat map could also be used for analyzing steering wheel torsional vibrations. An evaluation of an evaluation data set could also take place at regular time intervals, for example, of multiple days or weeks.

The analysis unit subsequently checks whether a behavior deviating from a normal state is present. If a behavior deviating from a normal state is detected during the analysis of the evaluation data set 18, a notification message is thus generated, in the present case in particular by means of the analysis unit, which is subsequently displayed by means of a display unit 76 of the vehicle 10, for example, a warning lamp, and/or transmitted to an external electronic unit, for example, of a repair shop, whereby in particular an advantageous notification function and/or warning function can be implemented.

To improve the at least partial compensation of the steering wheel torsional vibrations, the evaluation data set 18 can furthermore be used to adapt the transfer function. For this purpose, the evaluation data set has an operational connection to the compensation unit 74.

The transfer function can be adapted in this case once, for example, by a software update, and/or continuously, for example, by means of a regulator loop. Furthermore, a machine learning algorithm, for example, an artificial neuronal network, is advantageously used to adapt the transfer function, which is provided for an optimization of the at least partial compensation of the steering wheel torsional vibrations at least on the basis of the evaluation data set 18.

Figure 3:
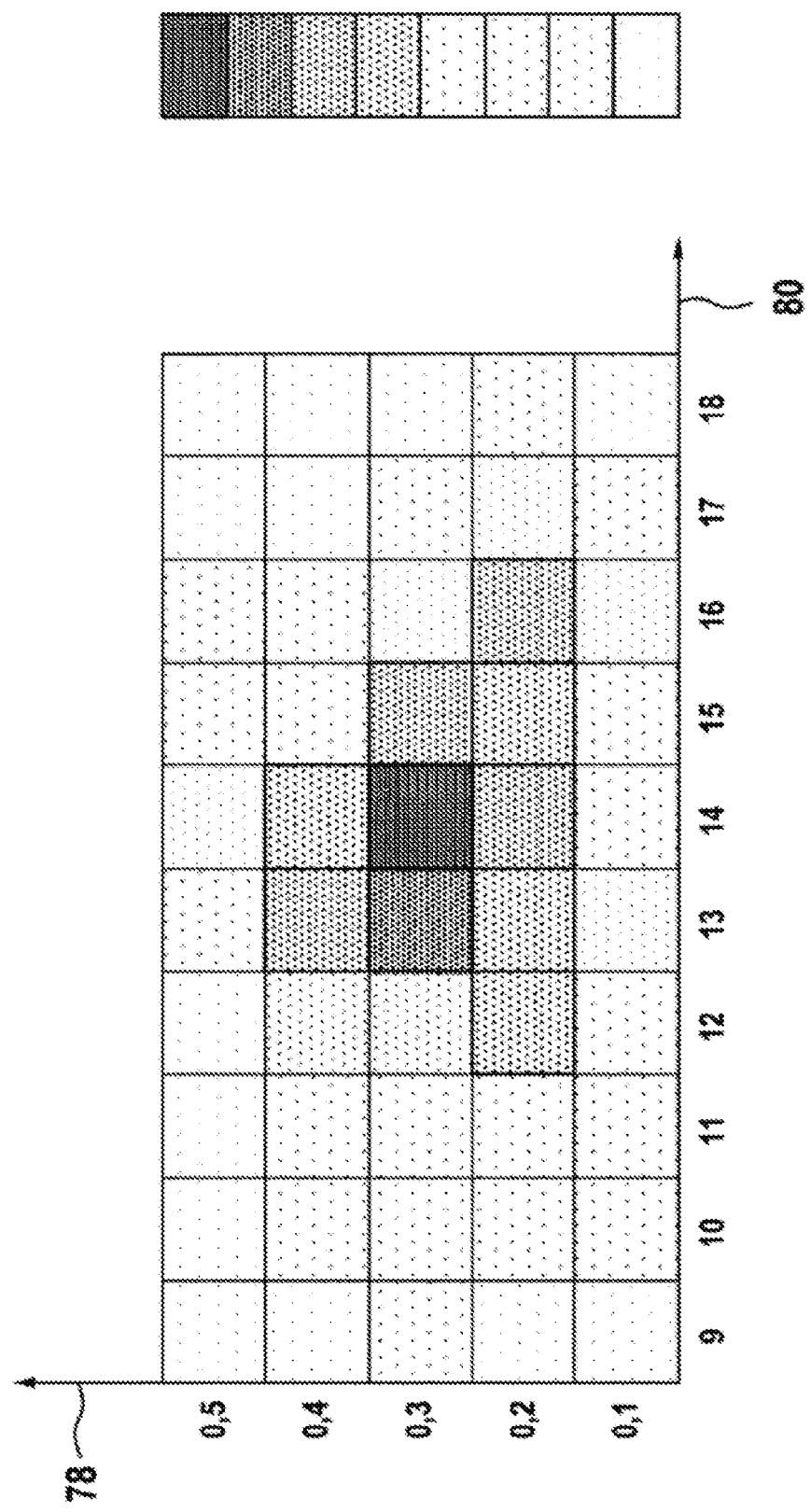
FIG. 3 shows a diagram of a heat map prepared from an evaluation data set.

FIG. 3 shows by way of example a diagram of a heat map prepared from the evaluation data set 18. The interference parameter 14, which is formed in particular as the interference amplitude, is plotted on an ordinate axis 78 in [Nm]. The wheel frequency 16 is represented in [Hz] on an abscissa axis 80. The temperature scale represents a frequency criterion, in which in particular the interference parameter 14 and the wheel frequency 16 are in a predefined state. In the present case, the interference parameter 14 is observed, for example, in 0.1 Nm steps in an interval between 0 Nm and 0.5 Nm. The interference parameter 14 could advantageously also be observed, however, in an interval between 0 Nm and 0.3 Nm. Furthermore, the wheel frequency 16 is observed by way of example in 1 Hz steps in an interval between 9 Hz and 18 Hz.

It may be seen on the basis of FIG. 3 that the interference parameter 14 is predominantly located in a range between 0.2 Nm and 0.4 Nm and the wheel frequency is located in the range between 13 Hz and 15 Hz, so that steering wheel torsional vibrations occur more frequently in this range at least in the observed vehicle 10.

Figure 4:
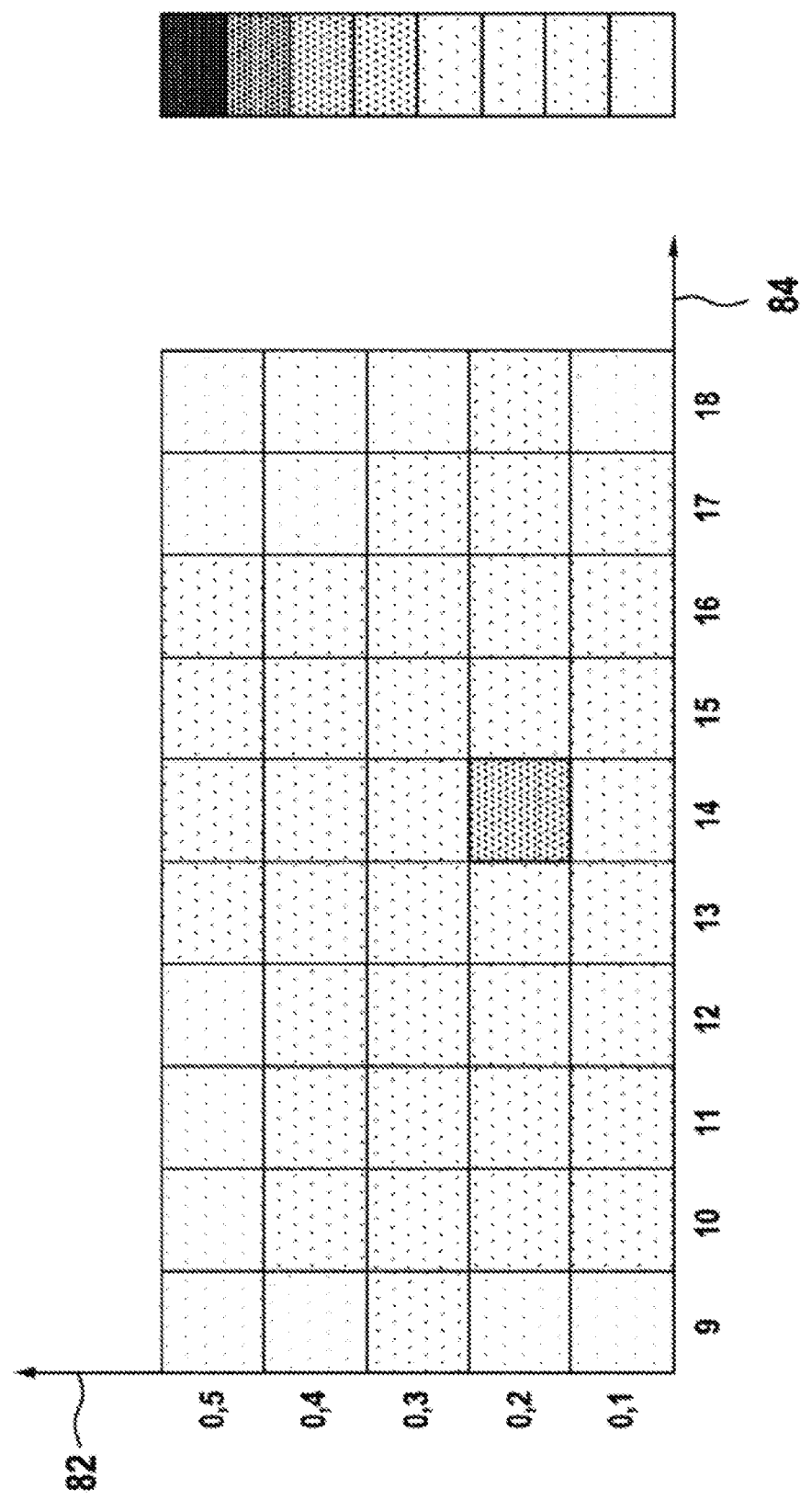
FIG. 4 shows a diagram of a further heat map prepared from an evaluation data set.

FIG. 4 shows by way of example a diagram of a further heat map prepared from the evaluation data set 18. The interference parameter 14, which is formed in particular as the interference amplitude, is again plotted on an ordinate axis 82 in [Nm], wherein the interference parameter 14 is observed by way of example in 0.1 Nm steps in an interval between 0 Nm and 0.5 Nm. The interference parameter 14 could advantageously also be observed, however, in an interval between 0 Nm and 0.3 Nm. The wheel frequency 16 is again represented in [Hz] on an abscissa axis 84, wherein the wheel frequency 16 is observed by way of example in 1 Hz steps in an interval between 9 Hz and 18 Hz. The temperature scale represents a chronological rate of change in the corresponding predefined states in this case.

On the basis of FIG. 4, for example, differences in the interference parameter 14 and the wheel frequency 16 for different seasons and in particular different tires of the vehicle 10 may be ascertained in this case. Moreover, a wear, a damage, a defect, and/or play in the steering system 38 and/or in the vehicle 10 can also be detected on the basis of FIG. 4, for example.

Figure 5:
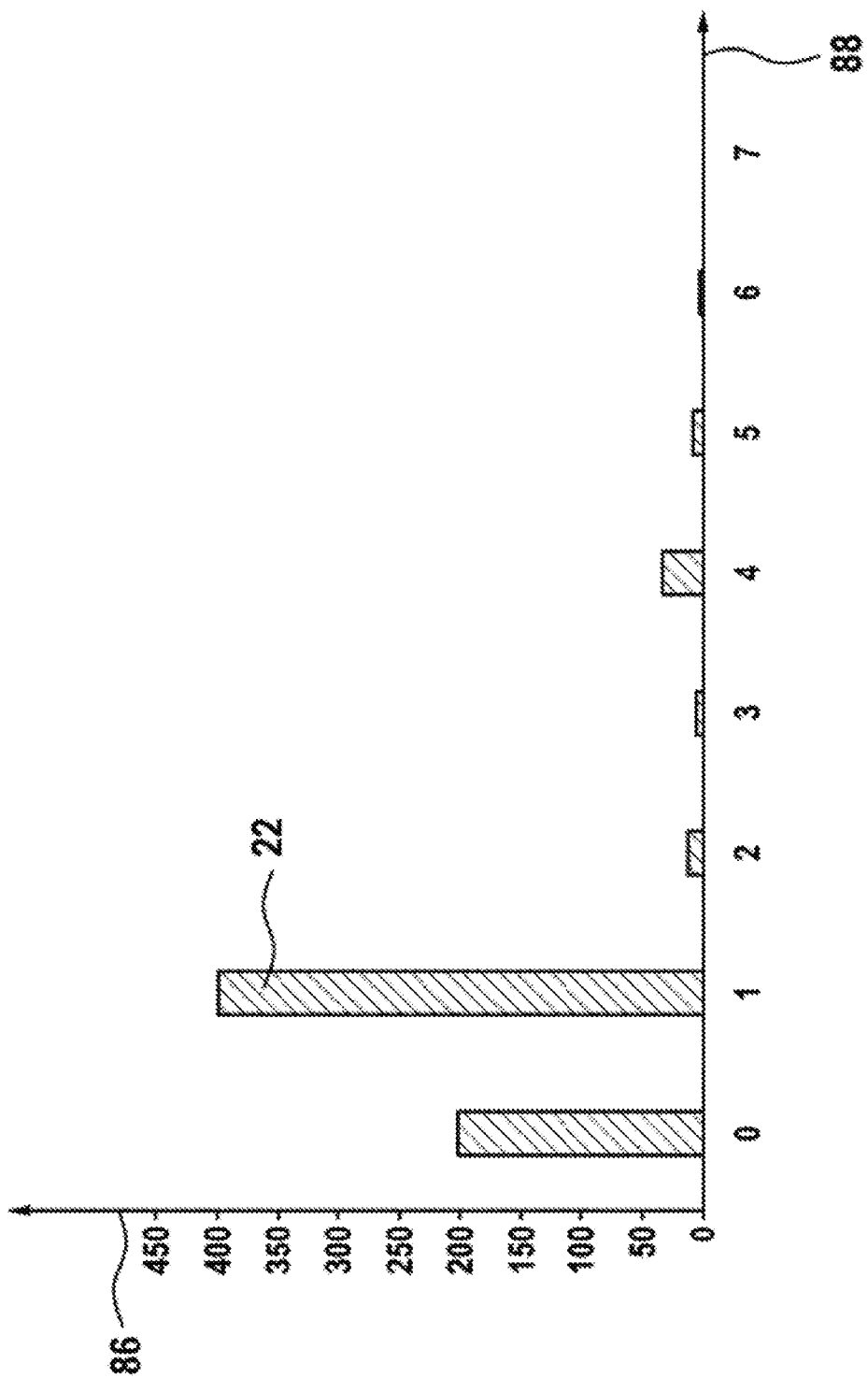
FIG. 5 shows an illustration of state parameters of an activation unit of the steering device.

FIG. 5 shows by way of example an illustration of state parameters 22 of the activation unit 24. A time, in particular a dwell time of the activation unit 24 in the individual states, is plotted in [h] on an ordinate axis 86. The different state parameters 22 are shown on an abscissa axis 88. In the present case the activation unit comprises by way of example seven different state parameters 22 and/or states, for example, "compensation active", "compensation inactive", "waiting", "ramp up compensation", "ramp down compensation", "compensation possible", and/or "compensation not possible".

Alternatively, an activation unit could also comprise precisely two state parameters and/or states, however, in particular "compensation active" and "compensation inactive", and/or an arbitrary different number of state parameters and/or states.

Figure 6:
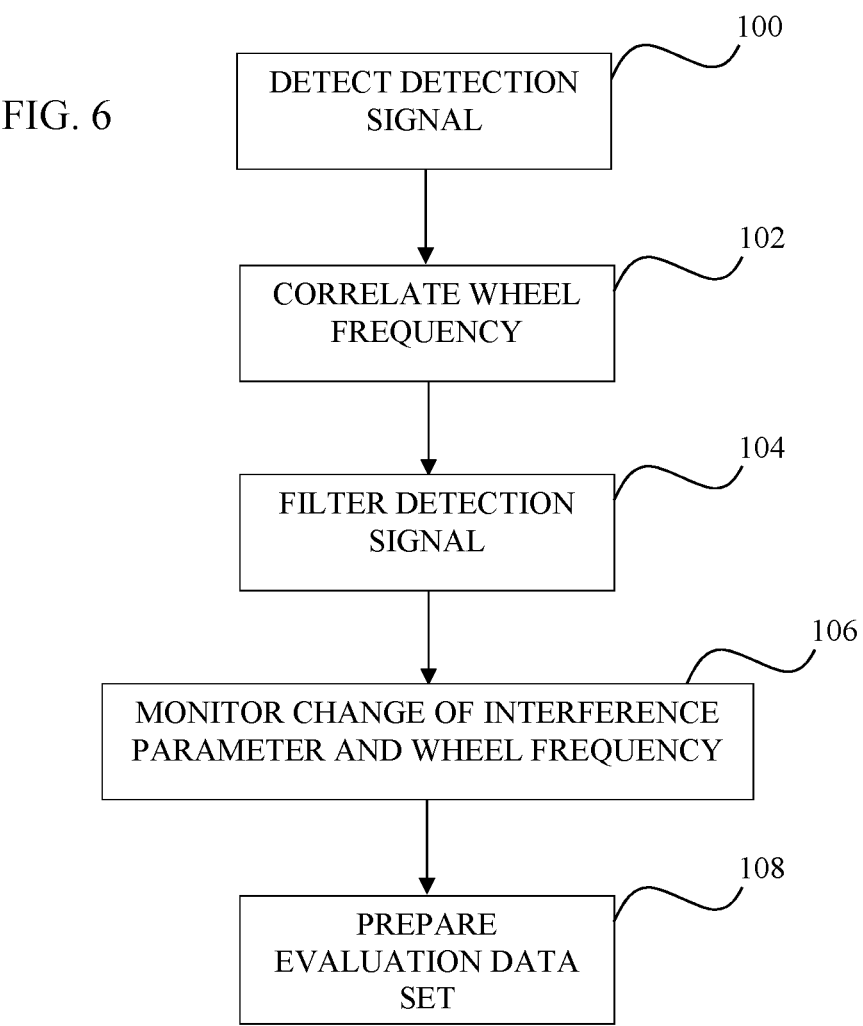
FIG. 6 shows an exemplary flow chart having main method steps of a method for analyzing and/or at least partially compensating for steering wheel torsional vibrations.

FIG. 6 furthermore shows an exemplary flow chart having main method steps of the method for analyzing and/or at least partially compensating for the steering wheel torsional vibrations.

In a method step 100, the detection signal 12 is detected by means of the detection unit 28.

In a method step 102, the wheel frequency 16 correlated with the present wheel speed parameter is ascertained.

In a method step 104, the detection signal 12 is filtered on the basis of the wheel frequency 16 by means of the filter unit 70 and the interference parameter 14 correlated with the steering wheel torsional vibration is extracted.

In a method step 106, a chronological change of the interference parameter 14 and the wheel frequency 16 is monitored during an entire monitoring time interval.

In a method step 108, the evaluation data set 18 is subsequently prepared from the obtained data and evaluated for analyzing and/or at least partially compensating for the steering wheel torsional vibrations.

Optional method steps can subsequently follow, for example, a preparation of a heat map, an ascertainment of a chronological rate of change in the evaluation data set 18, a consideration of the state parameters 22 of the activation unit 24, a generation of a notification message, and/or an adaptation of the transfer function using the evaluation data set 18.

Figure 7:
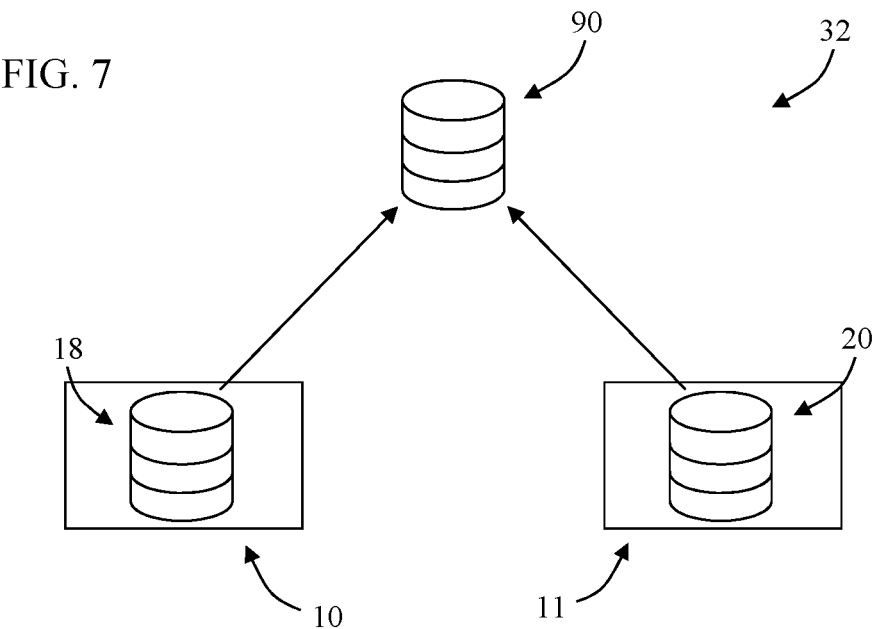
FIG. 7 shows an exemplary system comprising multiple steering devices.

FIG. 7 shows a system 32 comprising multiple, in the present case two by way of example, vehicles 10, 11, which each comprise a steering device according to the disclosure. In principle, however, a system can comprise an arbitrary number of further vehicles having steering devices according to the disclosure. Each of the steering devices comprises in this case a corresponding evaluation data set 18, 20, which can be combined with one another in the present case for analyzing and/or at least partially compensating for the steering wheel torsional vibrations. For this purpose, the system 32 comprises a data memory 90, which is in particular central and is advantageously operationally connected to the analysis unit, and which is provided for combining all evaluation data sets 18, 20.

The evaluation data sets 18, 20 can then be used, for example, to prepare a common heat map, on the basis of which steering wheel torsional vibrations of an individual vehicle 10, 11, a specific vehicle variant, and/or a specific vehicle type can be analyzed, recognized, and/or at least partially compensated for.

The invention claimed is:

1. A method for analyzing steering wheel torsional vibrations during operation of a steering device in a vehicle, the method comprising:
   detecting at least one detection signal;
   extracting, from the detection signal, at least one interference parameter correlated with the steering wheel torsional vibrations;
   monitoring, during a monitoring time interval, a chronological change of the at least one interference parameter and a chronological change of a wheel frequency correlated with a present wheel speed parameter;
   combining the chronological change of the at least one interference parameter and the chronological change of the wheel frequency to form a common evaluation data set;
   ascertaining at least one state parameter of an activation unit configured to at least one of activate and deactivate a compensation of the steering wheel torsional vibrations based on operating parameters of the steering device; and
   analyzing the steering wheel torsional vibrations based on the common evaluation set and the at least one state parameter of the activation unit.

2. The method as claimed in claim 1 further comprising:
   preparing a heat map using the common evaluation data set; and
   analyzing the steering wheel torsional vibrations by evaluating the heat map.

3. The method as claimed in claim 1 further comprising:
   ascertaining at least one of a chronological rate of change of the at least one interference parameter and a chronological rate of change of the wheel frequency in the common evaluation data set; and
   analyzing the steering wheel torsional vibrations based on the at least one of the chronological rate of change of the at least one interference parameter and the chronological rate of change of the wheel frequency.

4. The method as claimed in claim 1 further comprising:
   at least one of (i) reading out the common evaluation data set via a communication interface and (ii) wirelessly transmitting the common evaluation data set to an external analysis unit, at least for the analyzing the steering wheel torsional vibrations.

5. The method as claimed in claim 1 further comprising:
   generating at least one notification message in response to detecting, during an analysis of the common evaluation data set, that a behavior has deviated from a normal state.

6. The method as claimed in claim 1 further comprising:
   at least partially compensating for the steering wheel torsional vibrations by adapting a transfer function configured to generate a compensation signal at least using the common evaluation data set.

7. The method as claimed in claim 6, the at least partially compensating for the steering wheel torsional vibrations further comprising:
   adapting the transfer function using a learning algorithm that is provided based on the common evaluation data set and is configured to optimize the at least partial compensation of the steering wheel vibrations.

8. The method as claimed in claim 1 further comprising:
   ascertaining at least one further evaluation data set from a further vehicle; and
   combining the at least one further evaluation data set with the common evaluation data set for the at least one of the analyzing and the at least partially compensating for the steering wheel torsional vibrations.

9. The method of claim 1, wherein the monitoring time interval is at least two months in duration.

10. A steering device of a vehicle, the steering device comprising:
    a detection unit configured to detect at least one detection signal; and
    a processing unit for analyzing steering wheel torsional vibrations during operation of the steering device, the processing unit configured to:
      extract, from the detection signal, at least one interference parameter correlated with the steering wheel torsional vibrations;
      monitor, during a monitoring time interval, a chronological change of the at least one interference parameter and a chronological change of a wheel frequency correlated with a present wheel speed parameter;
      combine the chronological change of the at least one interference parameter and the chronological change of the wheel frequency to form a common evaluation data set;
      ascertain at least one state parameter of an activation unit configured to at least one of activate and deactivate a compensation of the steering wheel torsional vibrations based on operating parameters of the steering device; and
      analyze the steering wheel torsional vibrations based on the common evaluation set and the at least one state parameter of the activation unit.

11. The steering device as claimed in claim 10, wherein:
    the steering device is one of multiple steering devices in a system; and
    respective evaluation data sets of each of the multiple steering devices are combined with one another for the at least one of the analyzing and the at least partially compensating for the steering wheel torsional vibrations.

12. The steering device of claim 10, wherein the processing unit is further configured to:
    at least partially compensate for the steering wheel torsional vibrations by adapting a transfer function configured to generate a compensation signal at least using the common evaluation data set.

13. The steering device of claim 10, wherein the monitoring time interval is at least two months in duration.

14. A control unit for at least partially compensating for steering wheel torsional vibrations during operation of a steering device in a vehicle, the control unit comprising:
    a processing unit configured to:
      detect at least one detection signal;
      extract, from the detection signal, at least one interference parameter correlated with the steering wheel torsional vibrations;
      monitor, during a monitoring time interval, a chronological change of the at least one interference parameter and a chronological change of a wheel frequency correlated with a present wheel speed parameter;
      combine the chronological change of the at least one interference parameter and the chronological change of the wheel frequency to form a common evaluation data set; and at least partially compensate for the steering wheel torsional vibrations by adapting a transfer function configured to generate a compensation signal at least using the common evaluation data set.

15. The control unit of claim 14, wherein the processing unit is further configured to:
at least partially compensate for the steering wheel torsional vibrations by adapting a transfer function configured to generate a compensation signal at least using the common evaluation data set.

16. The control unit of claim 14, wherein the monitoring time interval is at least two months in duration.

\* \* \* \* \*